Figures 1, 2, 3:
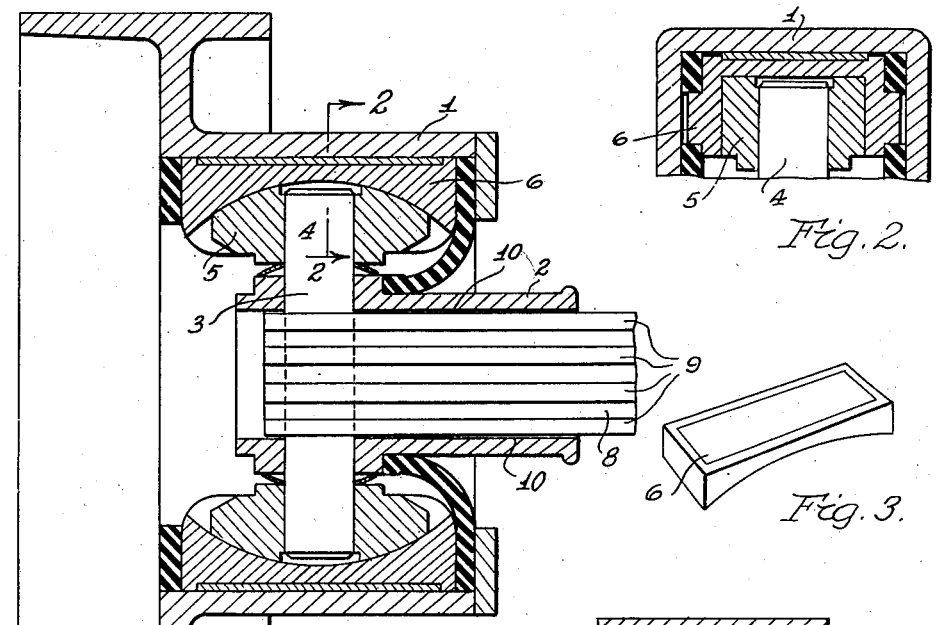

June 6, 1939.  C. D. CUTTING  2,161,137

SPLINE SHAFT CONSTRUCTION

Filed March 1, 1937

INVENTOR.
CHARLES D. CUTTING
BY
ATTORNEY

Patented June 6, 1939

2,161,137

UNITED STATES PATENT OFFICE 2,161,137

SPLINE SHAFT CONSTRUCTION

Charles D. Cutting, Detroit, Mich., assignor to The Cutting Sales & Engineering Corporation, a corporation of Michigan Application March 1, 1937, Serial No. 128,389

11 Claims. (Cl. 64—1)

This invention relates to spline shaft constructions and has for its object to provide mating spline members of improved strength, of more economical construction and of longer life and is a continuation-in-part of my copending application Serial No. 115,680, filed December 14, 1936, now Patent No. 2,117,706.

The manufacture of splined shafts now requires a hobbing operation. Broaching can be done rapidly and at very small cost, however, hobbing costs several hundred percent more. It is therefore an object of this invention to teach the manufacture of a splined shaft by broaching and without hobbing.

When a shaft is broached the formed sides have practically flat surfaces. The flatness of these surfaces cannot be attained by the usual hobbing operation since it is commercially impossible to cause a hob to follow a straight line during rapid cutting. The result is that the spline surfaces are wavy and when assembled against similar surfaces the driving forces are transmitted through the contacting high spots and not over the entire spline surfaces. These members may be tight when new but as the high spots wear down during use, looseness of fit and eventual rattling result. It is an object of this invention to provide a spline which may constitute a shaft end and which may be made by broaching instead of the usual hobbing thereby taking complete advantage of the accuracy of this broaching operation since it is the final and only operation of the spline surfaces. The shaft end thus formed may be secured in any desired manner to a shaft, as for instance, a tubular propeller shaft of a vehicle.

The loading on a spline is proportional to its mean radius from the shaft axis. It is a further object of this invention to provide a shaft having a reduced number of splines so arranged with respect to the shaft axis as to progressively increase in distance from the axis thereby giving the effect of a long spline lever arm contained in a small overall diameter. The result is a shaft, rectangular in cross-section with two opposite sides splined which can be mated with a second spline member of substantially less diameter than would be required for a round shaft having a diameter equal to that of a diagonal of the square shaft. The square shaft is thus stronger than a round shaft from the same amount of material used and the capacity of the splines is adequate.

Another object of this invention is to provide improved lubrication. Since only two faces of the shaft need be splined the improved lubrication is accomplished by providing clearances between the non-splined faces and the adjacent faces of the mating member thus forming lubricating ducts.

A further object is to teach the attachment of the square splined shaft to a round shaft, the latter shaft being an automobile propeller shaft or any other shaft to drive or to be driven through the splined members.

A still further object is to provide an improved splined shaft for use with a universal joint.

Figure 5:
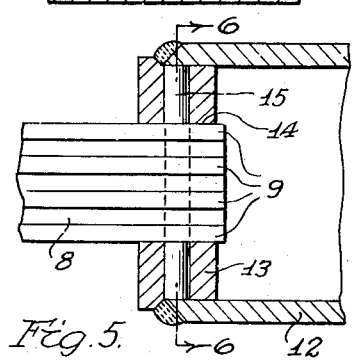
Figure 4:
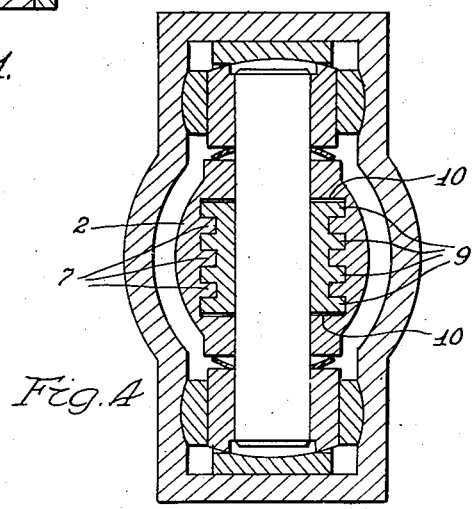
Figure 6:
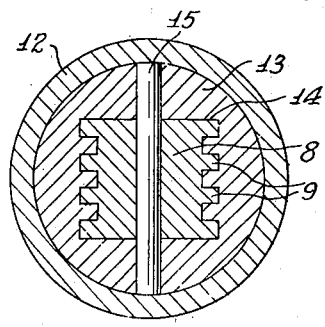
Figure 8:
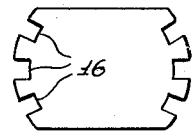
Figure 7:
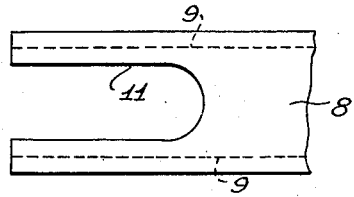

Other objects and advantages will become hereinafter more fully apparent as reference is had to the accompanying drawing wherein:

Fig. 1 is a longitudinal diametric section through a universal joint equipped with my improved shaft, Fig. 2 is a section taken along the line 2—2 of Fig. 1, Fig. 3 is a perspective of a bearing slipper, Fig. 4 is a transverse diametric view of a modified form of joint showing my improved shaft in section, Fig. 5 shows a longitudinal section of a propeller shaft and with the improved shaft secured thereto, Fig. 6 is a transverse section taken along the line 6—6 of Fig. 5, Fig. 7 is a top elevation of the universal joint engaging end of the shaft of Fig. 1, and Fig. 8 is an end view of a modified form of shaft.

More particularly, Figs. 1, 2, 3 and 4 illustrate a two bearing universal joint as described and claimed in my copending application Serial No. 115,680 filed December 14, 1936, aforementioned. The joint of Fig. 1 is the same as in Fig. 4 except for the bearing assembly and for purposes of this application will be treated as the same joint. It consists of a housing member 1 and a yoke member 2. Transversely through the member 2 is a pin 3 each end 4 of which constitutes a trunnion for a bearing member 5 of arcuate outer surface for engagement with a bearing member 6 of arcuate inner surface. The arcuate surface of the member 6 is longer than the contacting surface of the member 5 therewith so that the yoke member 2 may swing through a vertical arc from the position shown in Fig. 1. It may also be swung through a horizontal arc, the pin 3 rotating in the members 5.

The member 2 has an opening longitudinally therethrough, which is preferably rectangular in cross-section. This opening is provided with splines 7 on two opposite sides with the top and bottom thereof being flat. A splined shaft 8 is provided for the opening in the member 2, the shaft also being rectangular in cross-section and having splines 9 on two opposite sides for engagement with the splines 7, the other two sides being flat. The distance between the flat sides of the shaft 8 is less than the distance between the flat sides of the opening through the member 2 thereby forming lubricant passages 10.

In order to avoid the so-called "broken back" joint construction, the front end of the shaft may be slotted at 11 to straddle the pin 3. The slot extends between the flat sides of the shaft and does not interrupt the splines. In the case of a four bearing or cardon cross type joint the slot would not be used.

The splines extend the length of the shaft 8 and in order to connect this shaft to a propeller shaft 12 of tubular formation, the shaft enters a collar 13 of cylindrical exterior which is welded into the end of the shaft 12. The collar has an opening 14 shaped in counterpart of the shaft 8 so that the shaft has a driving fit therewith. A transverse pin 15 locks the collar and the shaft.

While it is desirable that the shaft be provided with two opposite flat sides, all sides do not have to be flat as the cross-sectional shape may be at least partially circular as indicated at 16 in Fig. 8.

What is claimed is:

1. A splined shaft of uniform rectangular cross-section having a plurality of splines on each of two opposed faces.

2. A splined shaft having a portion of the periphery splined and the remainder of the periphery planar, the splines having a length equal to the planar portions.

3. A splined shaft wherein some of the splines are at greater distances from the center of the shaft than others.

4. A splined shaft having a plurality of groups of splines thereon with the splines of each group each being at a different distance from the center of the shaft.

5. A splined shaft having a slot longitudinally thereof.

6. A splined shaft of rectangular cross-section having a slot longitudinally thereof with the walls of said slot being parallel to opposite sides of the shaft.

7. A splined shaft of rectangular cross-section having two opposed sides splined and the other two opposed sides planar, and a longitudinal slot interrupting the two planar sides.

8. A drive shaft of circular construction having a rectangular splined end integrally secured thereto, said end being uniform in any transverse cross section.

9. A propeller shaft of tubular construction having an end portion of solid stock, said end portion being splined in spaced groups.

10. A splined shaft having a plurality of groups of splines separated by smooth portions of greater width than the distance separating the teeth within any group, said shaft having transverse cross-sections identical throughout its length.

11. A splined shaft having a plurality of groups of spline teeth separated by smooth portions, said smooth portions each having an area greater than the distance separating the teeth in any group and greater than the area of the top of any of said teeth.

CHARLES D. CUTTING.